(12) United States Patent
Aizawa

(10) Patent No.: US 8,988,375 B2
(45) Date of Patent: Mar. 24, 2015

(54) DEVICE AND METHOD FOR EXTRACTING DATA ON A TOUCH SCREEN

(71) Applicant: Sony Mobile Communications Japan, Inc., Minato-ku (JP)

(72) Inventor: Takahiro Aizawa, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 137 days.

(21) Appl. No.: 13/647,899

(22) Filed: Oct. 9, 2012

(65) Prior Publication Data
US 2014/0098031 A1 Apr. 10, 2014

(51) Int. Cl.
G06F 3/041 (2006.01)
G06F 3/0488 (2013.01)
(52) U.S. Cl.
CPC ............ *G06F 3/041* (2013.01); *G06F 3/04883* (2013.01)
USPC ......................................................... 345/173

(58) Field of Classification Search
None
See application file for complete search history.

(56) References Cited

U.S. PATENT DOCUMENTS 8,713,464 B2 * 4/2014 Aides et al. .................... 715/773
2012/0022854 A1 * 1/2012 Hoshino et al. .................... 704/9

FOREIGN PATENT DOCUMENTS

JP 2010-102666 5/2010

* cited by examiner

*Primary Examiner* — Joseph Haley
(74) *Attorney, Agent, or Firm* — Oblon, McClelland, Maier & Neustadt, L.L.P.

(57) ABSTRACT

An information processing apparatus that detects touch input at a touch panel disposed on or formed integrally with a display, extracts one or more character strings from a plurality of character strings displayed on the display based on the detected touch input, prioritizes the extracted one or more character strings, and controls the display to display the extracted one or more character strings in order based on the prioritizing.

16 Claims, 8 Drawing Sheets

FIG. 8
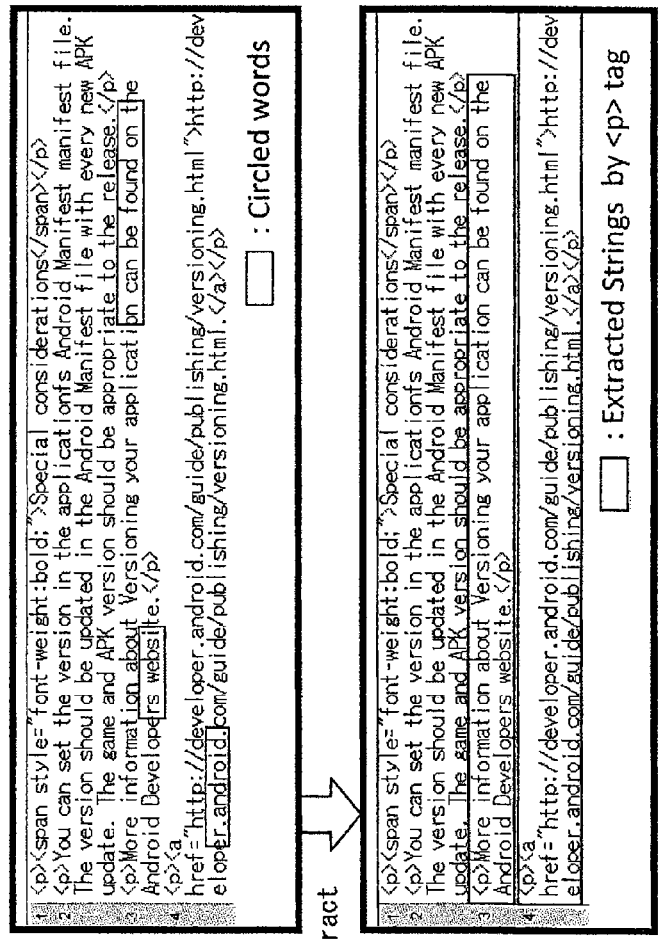
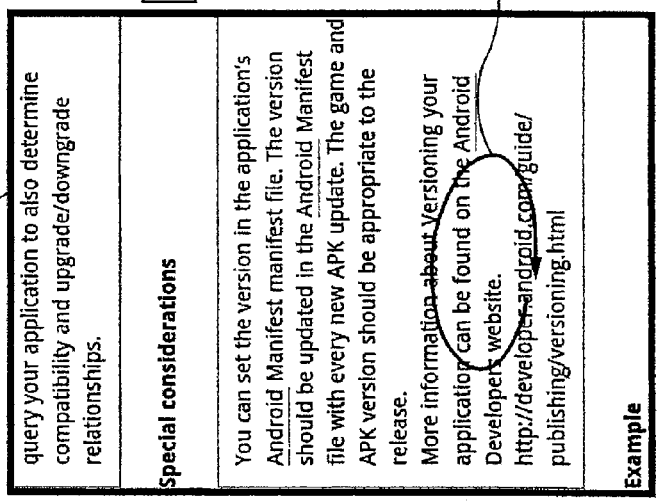

DEVICE AND METHOD FOR EXTRACTING DATA ON A TOUCH SCREEN

BACKGROUND

1. Field of the Disclosure

This disclosure relates to extracting data displayed on a touch screen by performing a touch operation on the touch screen surface using an instruction object.

2. Description of the Related Art

Mobile devices, such as smart phones, are available for displaying data on a screen. The displayed data may include pictures, text, videos, or web pages. The mobile devices may include a touch screen, which may be configured to accept user inputs in the form of a touch operation. The touch operation may correspond to the user contacting the surface of the touch screen with an instruction object, such as a finger or stylus. The data displayed at the touch screen coordinates where the user performs the touch operation may correspond to data on which the user desires further processing be performed.

Due to size considerations of many mobile devices, the touch screen may display data in such a way that accurately selecting particular data becomes difficult. For example, a user performing a touch operation to select a particular desired word within a displayed text paragraph may result in a word adjacent to the desired word being erroneously selected. This results in additional touch operations or unnecessary processing being performed, which is inconvenient to the user.

SUMMARY

Devices and methods for correctly and easily selecting data on a touch screen using a touch operation are discussed herein.

According to one exemplary embodiment, the disclosure is directed to an information processing apparatus that detects touch input at a touch panel disposed on or formed integrally with a display, extracts one or more character strings from a plurality of character strings displayed on the display based on the detected touch input, prioritizes the extracted one or more character strings, and controls the display to display the extracted one or more character strings in order based on the prioritizing.

According to another exemplary embodiment, the disclosure is directed to a method performed by an information processing apparatus, the method including detecting a touch input at a touch panel disposed on or formed integrally with a display, extracting one or more character strings from a plurality of character strings displayed on the display based on the detected touch input, prioritizing the extracted one or more character strings, and controlling the display to display the extracted one or more character strings in order based on the prioritizing.

According to another exemplary embodiment, the disclosure is directed to a non-transitory computer-readable medium including computer program instructions, which when executed by an information processing apparatus, cause the information processing apparatus to perform a process including detecting a touch input at a touch panel disposed on or formed integrally with a display, extracting one or more character strings from a plurality of character strings displayed on the display based on the detected touch input, prioritizing the extracted one or more character strings, and controlling the display to display the extracted one or more character strings in order based on the prioritizing.

The foregoing general description of the illustrative implementations and the following detailed description thereof are merely exemplary aspects of the teachings of this disclosure, and are not restrictive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 8 illustrates exemplary processing according to another aspect of the present disclosure.

DETAILED DESCRIPTION

Figure 1:
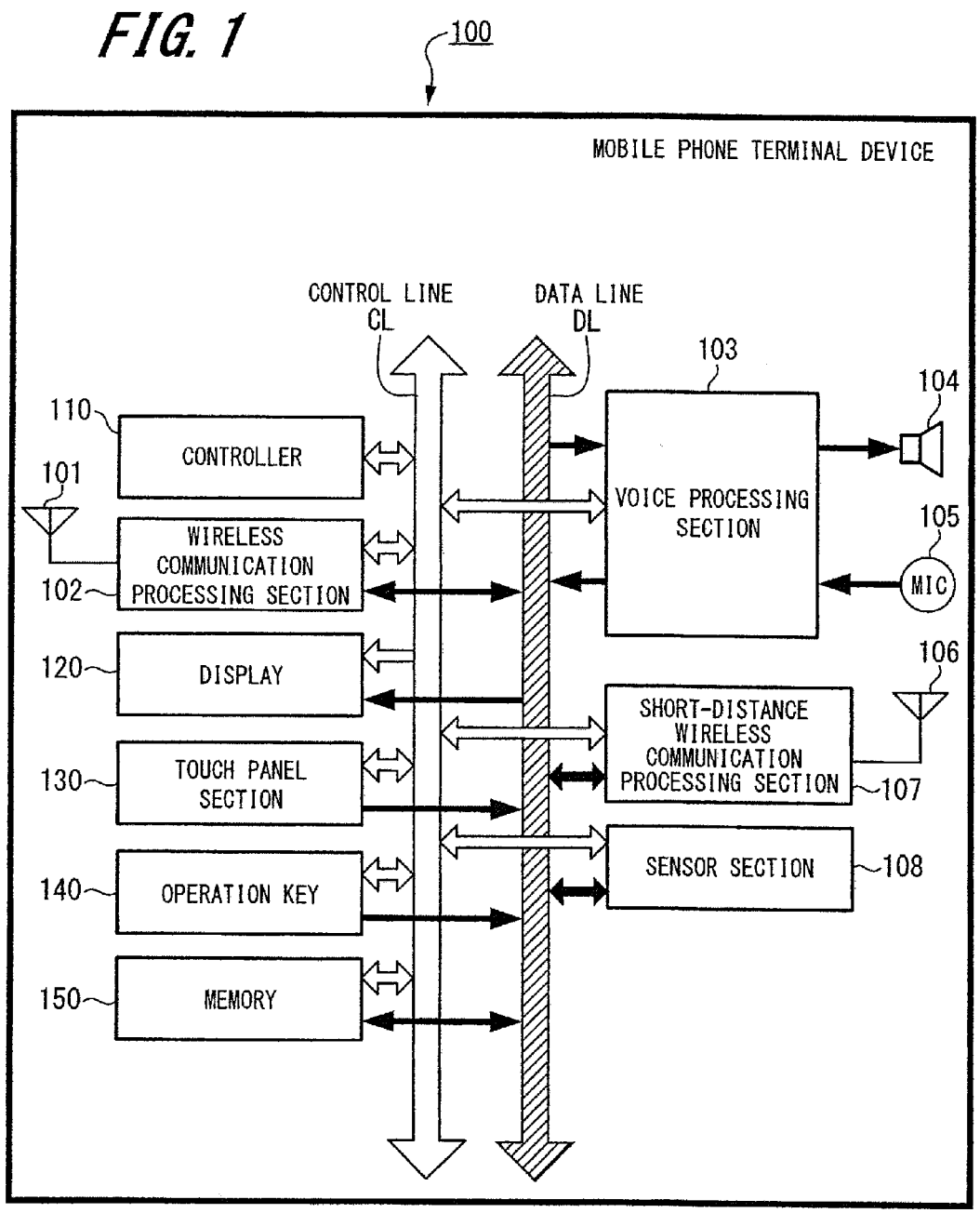
FIG. 1 illustrates schematically an exemplary mobile phone terminal device.

Referring now to the drawings, wherein like reference numerals designate identical or corresponding parts throughout the several views.

FIG. 1 illustrates a schematic block diagram of an exemplary mobile phone terminal device 100. As shown in FIG. 1, the mobile phone terminal device 100 may include an antenna 101 and a wireless communication processing section 102. The wireless communication processing section 102 may communicate wirelessly via radio signals, or the like, with other mobile devices via, e.g., a base station. Further, a data signal, such as a voice transmission from another user, may be received by antenna 101 and sent to the wireless communication processing section 102 for further processing. In the case of an incoming voice transmission, the voice data signal may be sent from the wireless communication processing section 102 to a voice processing section 103. Incoming voice data received by the voice processing section 103 via the wireless communication processing section 102 may be output as sound via a speaker 104.

Conversely, an outgoing voice signal may be supplied by a user to the voice processing section 103 via a microphone 105. The voice signal received via microphone 105 and processed by the voice processing section 103 may be sent to wireless communication processing section 102 for transmission by the antenna 101.

A second antenna 106 may be supplied for use with a short distance wireless communication processing section 107. The short distance wireless communication processing section 107 may communicate wirelessly with other devices over a network, such as the Internet, a local area network (LAN), or a wide area network (WAN). The second antenna 106 may, e.g., by a Wi-Fi transceiver.

A sensor section 108 may be provided for the mobile phone terminal device 100. The sensor section 108 may be a motion sensor that detects a motion of an object in the proximity of the mobile phone terminal device 100. The motion may correspond to a user moving an instruction object, such as a finger or stylus, in the proximity of the mobile phone terminal device 100 for the purpose of selecting data displayed on display 120.

The mobile phone terminal device 100 may include display 120. The display 120 may be, e.g., a liquid crystal display (LCD) panel, an organic electroluminescent (OLED) display panel, a plasma display panel, or the like. The display 120 may, e.g., display text, an image, a web page, a video, or the like. For example, when the mobile phone terminal device 100 connects with the Internet, the display 120 may display text and/or image data which is transmitted from a web server in Hyper Text Markup Language (HTML) format and displayed via a web browser. The display 120 may additionally display data stored in a memory 150.

A touch panel section 130 can detect a touch operation on the surface of the display 120. For example the touch panel 130 can detect a touch operation performed by an instruction object, such as a finger or stylus. Touch operations may correspond to user inputs, such as a selection of an icon or a character string displayed on the display 120. The touch panel section 130 may be an electrostatic capacitance type device, a resistive type touch panel device, or other such type devices for detecting a touch on a display panel.

The touch panel section 130 may perform processing related to touch operation classification. For example, the touch panel section 130 may assign a predetermined function to be performed when a "tap" touch operation is detected. Similarly, the touch panel section may analyze a touch operation in which the instruction object makes continuous contact with the display 120 while moving the instruction object around the display 120 (e.g., a "swipe" operation). The touch panel section 130 may output a signal based on a classification of the touch operation performed. The signal may, e.g., include information indicating the touch operation classification, the location on the display 120 where the touch operation was performed, and the operation to be performed based on the touch operation.

Data which is detected and processed by the touch panel 130 can be transmitted to a controller 110. The controller 110 may include one or more processor units and can control each element of the mobile phone terminal device 100 based on data detected by the touch panel 130, or by inputs received from operation key 140. The operation key 140 may receive inputs, e.g., from external control buttons included with the mobile phone terminal device 100. The external control buttons may, e.g., control the volume, the power, or a hold operation for the mobile phone terminal device 100.

The controller 110 may execute instructions stored in the memory 150. To this end, the memory 150 may be a non-transitory computer readable medium having instructions stored therein for controlling the mobile phone terminal device 100. Further, the controller 110 may include one or more processors for executing the instructions stored on the memory 150. The memory 150 may additionally store classification tables and character string tables, which are described in detail in later paragraphs with respect to the non-limiting examples illustrated in FIG. 4. In one aspect, the controller 110 may utilize the classification tables and/or the character string tables stored in the memory 150 in executing instructions for the mobile phone terminal device 100. However, the processing features of the controller 110 are not limited to using such tables, and other methods of performing these features may be utilized.

The mobile phone terminal device 100 can include a control line CL and a data line DL as internal bus lines for communication. The control line CL can be used to transmit control data from the controller 110. The data line DL may be used for the transmission of voice data, display data, or the like, throughout the various elements of the mobile phone terminal device 100.

Figure 2:
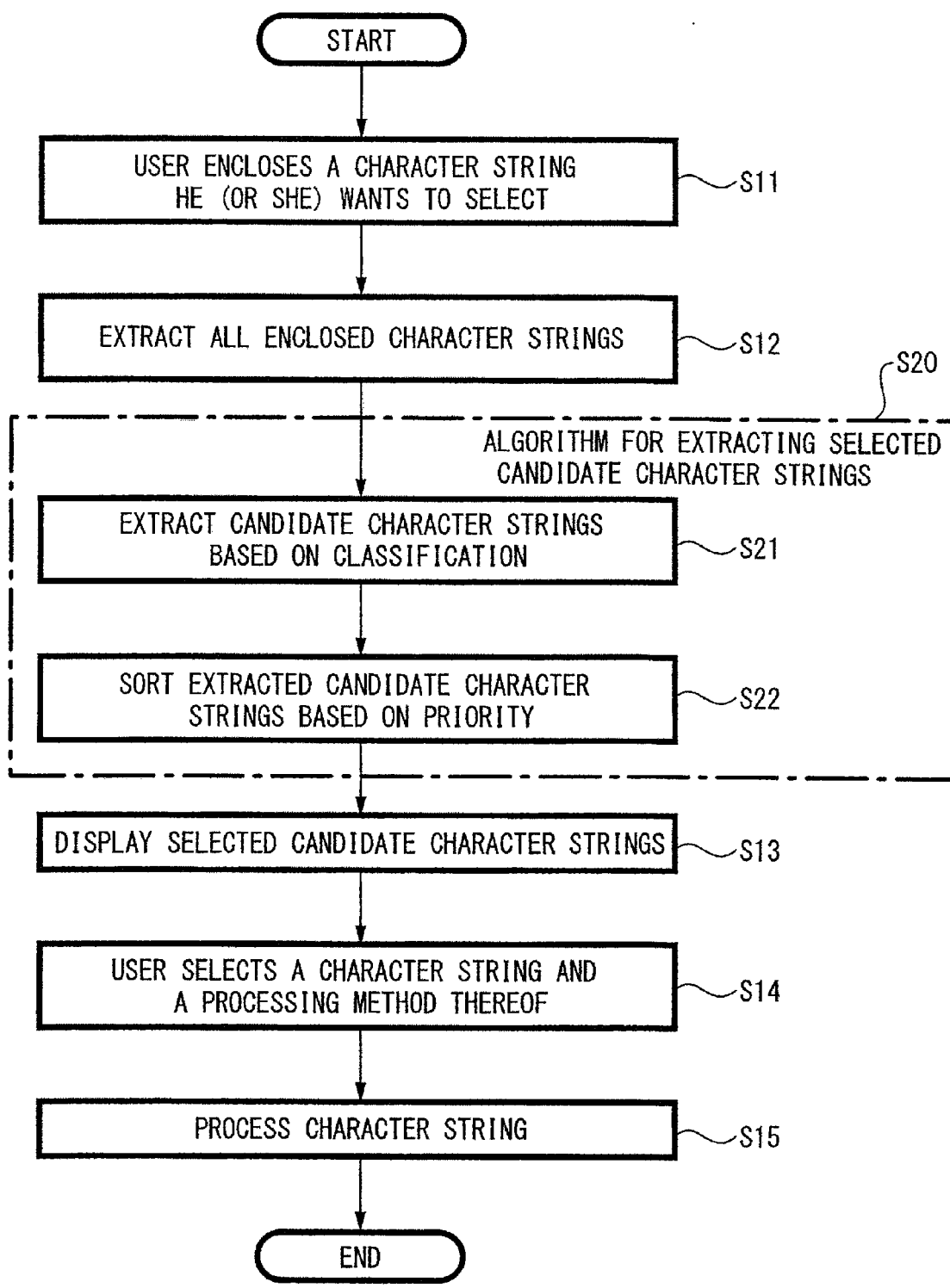
FIG. 2 illustrates an exemplary algorithmic flowchart for character extraction and related analysis.

FIG. 2 illustrates a non-limiting example of an algorithmic flowchart for extracting and analyzing data selected from a mobile device touch panel display. At step S11, a user encloses a data element displayed on the display 120 using an instruction object, such as a finger or a stylus. For example, the user may perform a circular type motion on the display such that a character string is enclosed within the circle. It should be appreciated that the touch operation of enclosing a data element on the display 120 is not limited to circular shapes. Such a touch operation may take the form of any "enclosed shape," which are defined hereinafter as any shape having continuous/connecting sides (e.g., a circle, an oval, a polygon, or any free-form shape with unbroken sides enclosing an area within).

Figure 5:
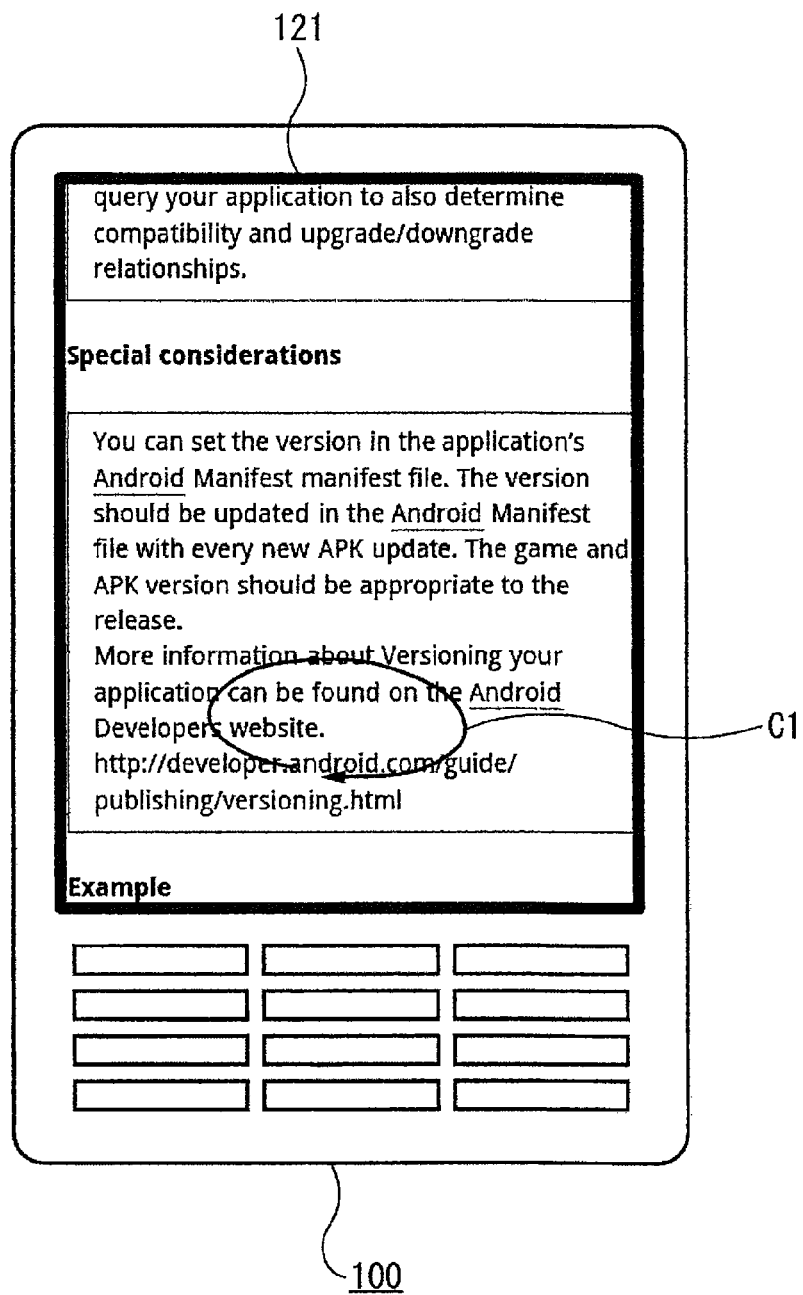
FIG. 5 illustrates an exemplary touch operation according to the method of FIG. 2.

FIG. 5 provides a non-limiting example of a touch operation that may be performed at step 11 of FIG. 2. Referring to FIG. 5, a user may encircle specific text from the plurality of text data displayed on display 121, wherein the user desires the controller 110 perform further processing on the encircled text. As an exemplary touch operation, the user may enclose text which the user wishes to extract for further processing by maintaining contact on the display 121 surface with an instruction object while moving the instruction object in a circular motion, as illustrated by circle C1.

Referring back to FIG. 2, the controller 110 extracts all the character strings enclosed by the user operation performed at step S11 based on an input from the touch panel 130 (step S12). The controller 110 may extract a character string corresponding to a displayed character string in which all or part of the displayed string is enclosed within the touch operation performed at step S11. The extracted character string is then processed by an algorithm for extracting selected candidate character strings (step S20) to identify one or more candidate character strings.

At step S21, the controller 110 divides the circle drawn by the user at step S11 into a plurality of portions using the starting point and ending point of the touch operation as reference. See, e.g., regions A1-A6 increasing sequentially from the starting point to the ending point of the touch operation illustrated in FIG. 3. The controller 110 classifies the character strings displayed in the respected divided portions using a predetermined classification method with which to analyze the candidate character strings. Each classification outcome for the classified candidate character strings may be assigned an associated classification priority value. Each divided portion of the circle may also be assigned an associated position priority value.

As an exemplary method of prioritizing the classified candidate character strings, the controller 110 multiplies the classification priority value by the position priority to obtain a value which determines the order in which the candidate character string is displayed. At step S22, the candidate character strings are sorted based on the determined priority order value.

At step S13, the display 120 displays the candidate character strings according to the determined priority order. For example, the display 120 may display the candidate character strings from the one that has the largest determined value to the one that has the smallest determined value. At step S14, a user may select any one of the character strings displayed in priority order on display 120. Once a character string is selected at step S14, a processing method associated with the associated character string may then be executed. At step S15, the controller 110 executes the associated processing method of the selected character string. For example, the selected character string may be a web link. Thus, when the web link is selected using the method of FIG. 2, the controller 110 may perform at step S15 an operation of downloading a web page corresponding to the selected web link.

Figure 3:
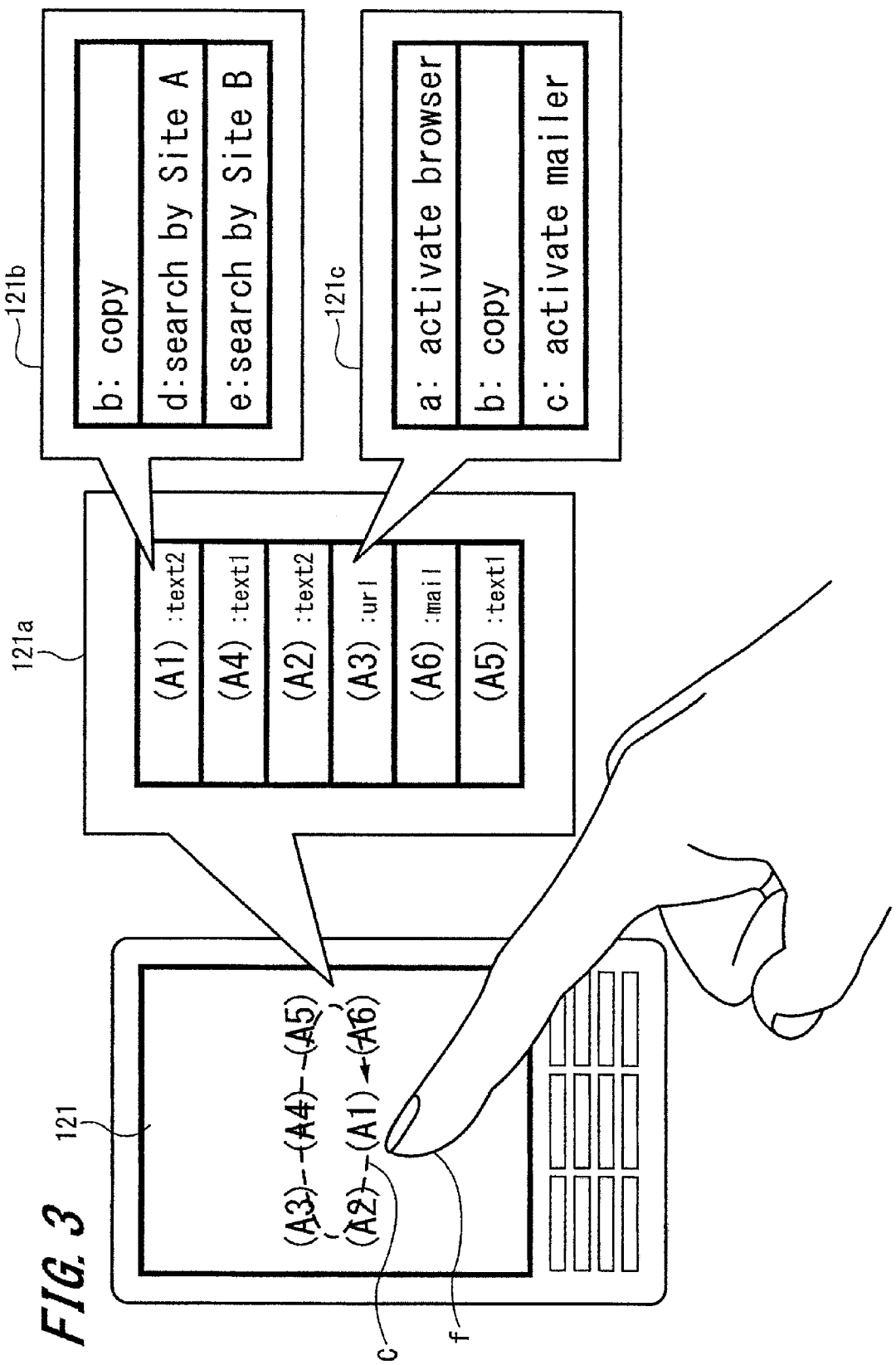
FIG. 3 illustrates exemplary touch operation processing according to the method of FIG. 2.

FIG. 3 illustrates an exemplary display transition for mobile phone terminal device 100 according to the method of FIG. 2. Referring to FIG. 3, the user touches the surface of the display 120 with an instruction object, illustrated in this example by finger f, and traces circle C on the display 120. The controller 110 divides the area enclosed by the circle C based on a start point and an end point. The division results in forming six regions A1-A6 within the circle C. It should be appreciated that while six regions are shown in FIG. 3 for illustration purposes, the controller 110 may divide the enclosed area by any number of regions.

The controller 110 extracts each character string or word which overlaps the location of each respective region A1-A6. In the case where multiple character strings are contained within a divided region of circle C, the entirety of the divided region is analyzed, and each individual character string within the region boundary is extracted. If only a portion of a character string is within the boundary of a divided region, the controller 110 may be configured to extract the entire character string corresponding to the overlapping portion. Further, the controller 110 may associate a character string overlapping multiple divided regions to each overlapped region, or may identify a single region for association.

As discussed with respect to FIG. 2, each extracted candidate character string is sorted according to a predetermined characterization and priority method. After sorting the extracted candidate character strings, the prioritized character string list may then be displayed to a user on the display 120. Display area 121a of FIG. 3 is an example of sorted character strings extracted from regions A1-A6.

Each extracted character string from regions A1-A6 may have a predetermined function associated with the character string. For example, when the extracted character string includes one or more words, processing functions associated with the extracted text may include copying the text and/or searching the extracted text using a search engine application. Display areas 121b and 121c of FIG. 3 illustrate exemplary processing functions which may be associated with an extracted character string and displayed to a user for selection. These display areas may be output on the display 120 when the user selects an extracted and prioritized character string, e.g., from the display area 121a. In the example of display area 121b, a character string extracted in region A1 may have associated functions of copying the text, searching the text in a site A, or searching the text in a site B. In the example of display area 121c, the extracted character string from region A3 may be a web uniform resource locator (URL) address, wherein the extracted URL has associated functions of activating a web browser, copying the URL, or activating an electronic mail application.

The associated processing functions discussed above for display areas 121b and 121c may be executed by the controller 110 when a user selects a desired function from a list of associated functions, such as that in display area 121c. Alternatively, an associated function may be executed immediately upon selection of an extracted and prioritized character string (i.e., the processing associated with displaying display areas 121b and 121c may be omitted).

Figure 4:
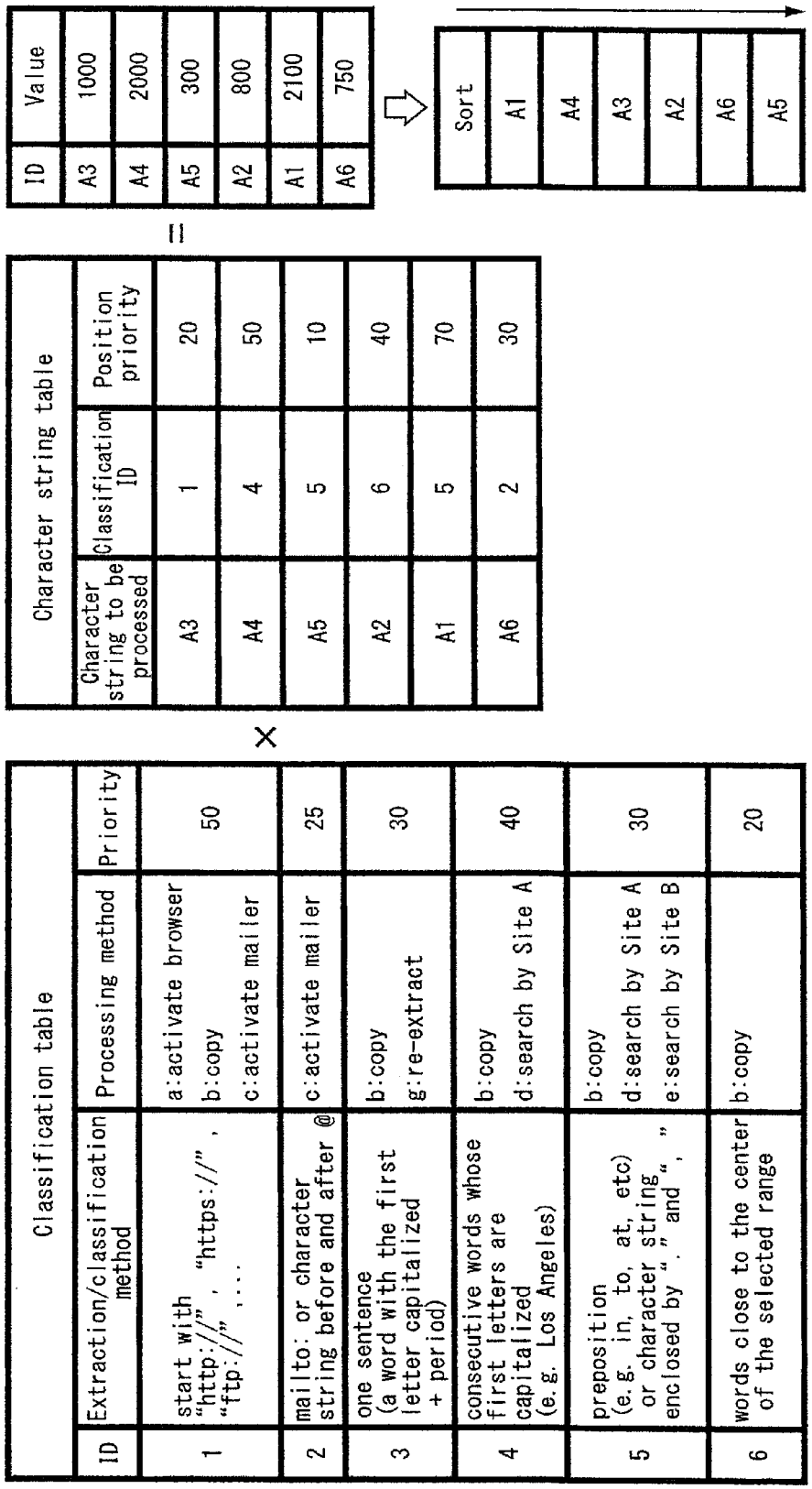
FIG. 4 illustrates an exemplary classification table, an exemplary character string table, and related processing thereto.

FIG. 4 illustrates a non-limiting example of processing related to an exemplary classification table 400 and an exemplary characterization string table 402. As shown in FIG. 4, the classification table 400 includes six exemplary classification IDs represented as ID 1 through ID 6.

ID 1 represents a classification of an extracted candidate character string as a web address. The classification may be performed, e.g., by determining the extracted candidate character string begins with "http://," "https://," "ftp://," etc. In the example of FIG. 4, ID 1 has three associated processing functions, which include activating a web browser, copying the web link, or activating an electronic mail application. Classification table 400 assigns a classification priority value of 50 to the ID 1 classification.

ID 2 represents a classification of a candidate character string consisting of the word "mailto" or "@." This classification may, e.g., represent an e-mail address. In the example of FIG. 4, ID 2 has one associated processing function of activating an electronic mail application. Classification table 400 assigns a classification priority value of 25 to the ID 2 classification.

ID 3 represents a classification of a candidate character string consisting of a sentence wherein the first word of the sentence is capitalized and the sentence ends in a period. In the example of FIG. 4, ID 3 has two associated processing functions, which include copying the extracted sentence or performing a re-extraction. Classification table 400 assigns a classification priority value of 30 to the ID 3 classification.

ID 4 represents a classification of a candidate character string consisting of consecutive words whose first letters are capitalized (e.g., Los Angeles). In the example of FIG. 4, ID 4 has two associated processing methods, which include copying the consecutive words or searching the words on a search engine included in a site A. Classification table 400 assigns a classification priority value of 40 to the ID 4 classification.

ID 5 represents a classification of a candidate character string which begins with a preposition (e.g., in, to, at, etc.). ID 5 may also represent a classification of a character string enclosed by a period or a comma. In the example of FIG. 4, ID 5 has three associated processing methods which include copying the character string, searching the character string in a search engine on a site A, or searching the character string in a search engine on a site B. Classification table 400 assigns a classification priority value of 30 to the ID 5 classification.

ID 6 represents a classification of a candidate character string consisting of a word or words which are close to the center of the area enclosed by the user's touch operation. In the example of FIG. 4, ID 6 has one associated processing method which includes copying the word or words. Classification table 400 assigns a classification priority value of 20 to the ID 6 classification.

The character string table 402 of FIG. 4 includes a position priority number for each of the six regions A1-A6. Referring back to the example of FIG. 3, the regions are determined by analyzing a start point and an end point of a user's touch operation. In FIG. 3, a user performs a touch operation corresponding to drawing a circle C with finger f. The start point of circle C corresponds to region A1, and the regions increase sequentially to the circle's end point, which is represented by region A6. Referring back to FIG. 4, the controller 110 determines the region associated with an extracted and classified character string, and multiplies the value of classification priority acquired from the classification table 400 with the value of the position priority acquired in the character string table 402. The result of the multiplication is shown in table 404.

As an example of the above-described classification and position priority value multiplication, when a candidate character string classified as ID 1 exists in a location corresponding to region A3, the value of 50 is assigned as a classification priority and a position priority value of 20 is assigned for region A3. These priority values are respectively assigned based on the information in the classification table 400 and the character string table 402. The classification priority value and the position priority value are then multiplied, resulting in a value of 1,000.

After determining the multiplication results for each divided region, the resultant values are sorted sequentially as shown in table 406. In the example of FIG. 4, the regions are sorted from highest to lowest. However, other sorting methods may be used. After sorting the calculated values, controller 110 causes the display 120 to display the sorted candidate character strings according to the sorted order of table 406. When displaying the sorted values, the controller 110 may cause the display 120 to display all or a subset of the sorted values, wherein hidden sorted values may be viewed by performing a scroll operation. Further, the display 120 may display only the sorted values that exceed a predetermined threshold.

It should be appreciated that the classification table 400 and the character string table 402 shown in FIG. 4 are merely illustrative examples and these tables are not limiting for the purposes of the controller 110 performing the above-described operations. Numerous combinations of classification IDs, classification types, processing methods, classification priority numbers, position priority numbers, etc., may be used in the classification and character string tables. For example, the priority values may be updated by the controller 110 according to a user's preferences or a user's behavioral characteristics. In this case, when a user frequently selects character strings of a particular classification, the classification priority value for that classification may be increased such that the associated character string is displayed prominently by default. The controller 110 may also adjust the values in the FIG. 4 tables according to inputs received by a user. Further, the data used in the classification and position priority methods of the controller 110 are not limited to the use of tables, and other classification and priority methods may be utilized.

FIG. 5 illustrates an exemplary touch operation according to the method of FIG. 2. FIG. 5 includes a mobile phone terminal device 100 with a display 120. The display 120 displays text to a user, wherein the user may perform a touch operation to select specific text using an instruction object, such as a finger or stylus. As shown in FIG. 5, the user may perform a touch operation corresponding to tracing a circle with the user's finger on the display 120 surface, as represented by circle C1. Following the detection of the user's touch operation by the touch panel section 130, the controller 110 extracts the character strings enclosed by the circle C1, e.g., using the method of FIG. 2. The controller 110 then obtains candidate character strings which are classified and prioritized using a predetermined method, such as the method discussed above with reference to FIG. 4.

Figure 6:
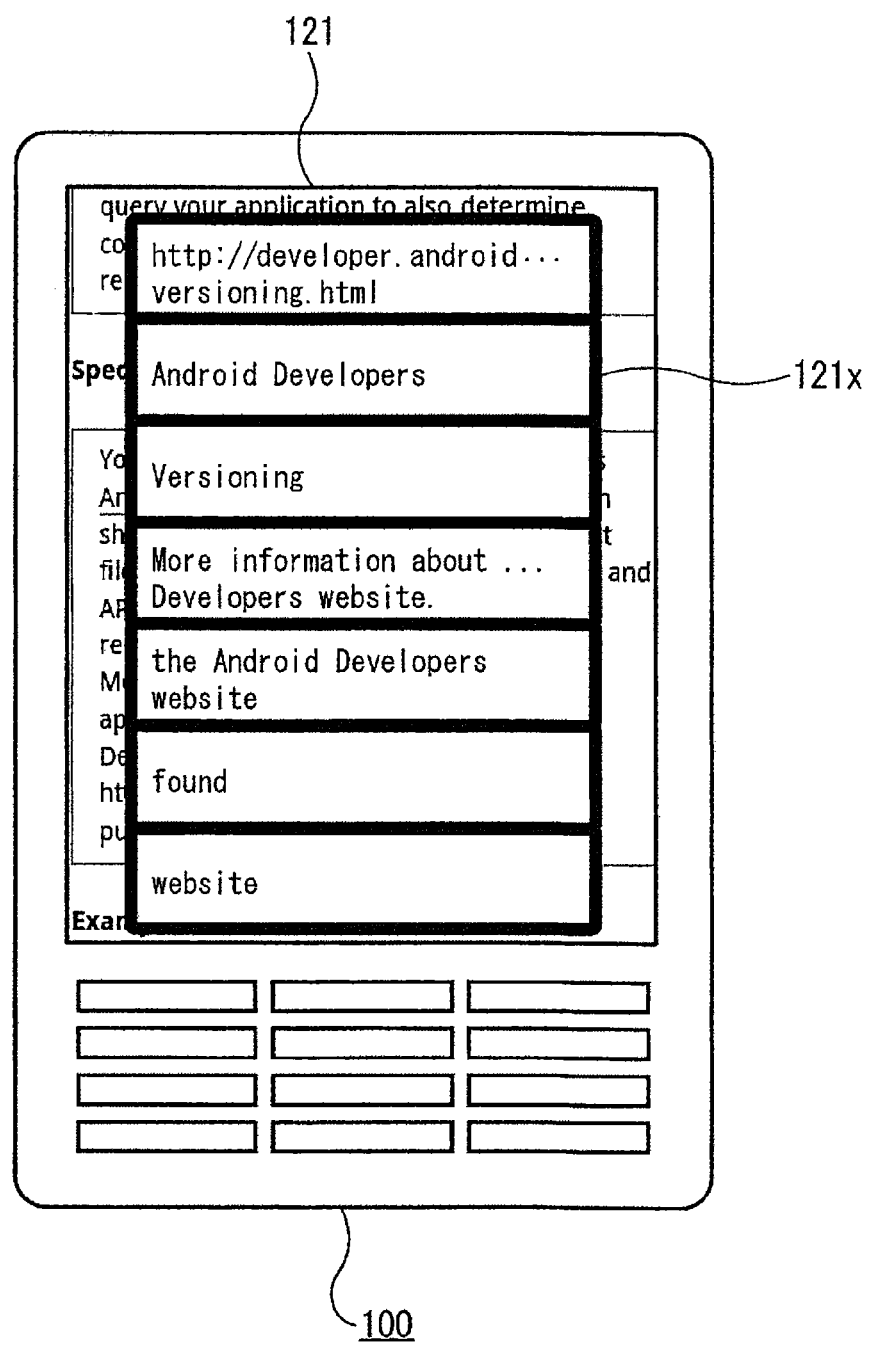
FIG. 6 illustrates exemplary processing related to the touch operation of FIG. 5.

A character string may be output to the display 120 following the classification and prioritization processing. Referring to FIG. 6, a display area 121x may be output to the display 120 based on the classification and prioritization result. Display area 121x includes the characterized and prioritized candidate character strings that were enclosed by the circle C1 in FIG. 5. The example of FIG. 6 includes seven candidate character strings displayed in display area 121x. In this example, the candidate character string with the highest priority value based on, e.g., the process of FIG. 4, is placed at the top of the display area 121x, and so on.

When displaying the display area 121x on the display 120, the controller 110 may control the display such that the background text on the display 120 is lower in luminescence, thereby highlighting the list shown in display area 121x via increased contrast. Further, the controller 110 may output the display area 121x on the display 120 in any position within the display 120 viewable area. The example of FIG. 6 shows the display area 121x being displayed in a central region of the display 120.

Figure 7:
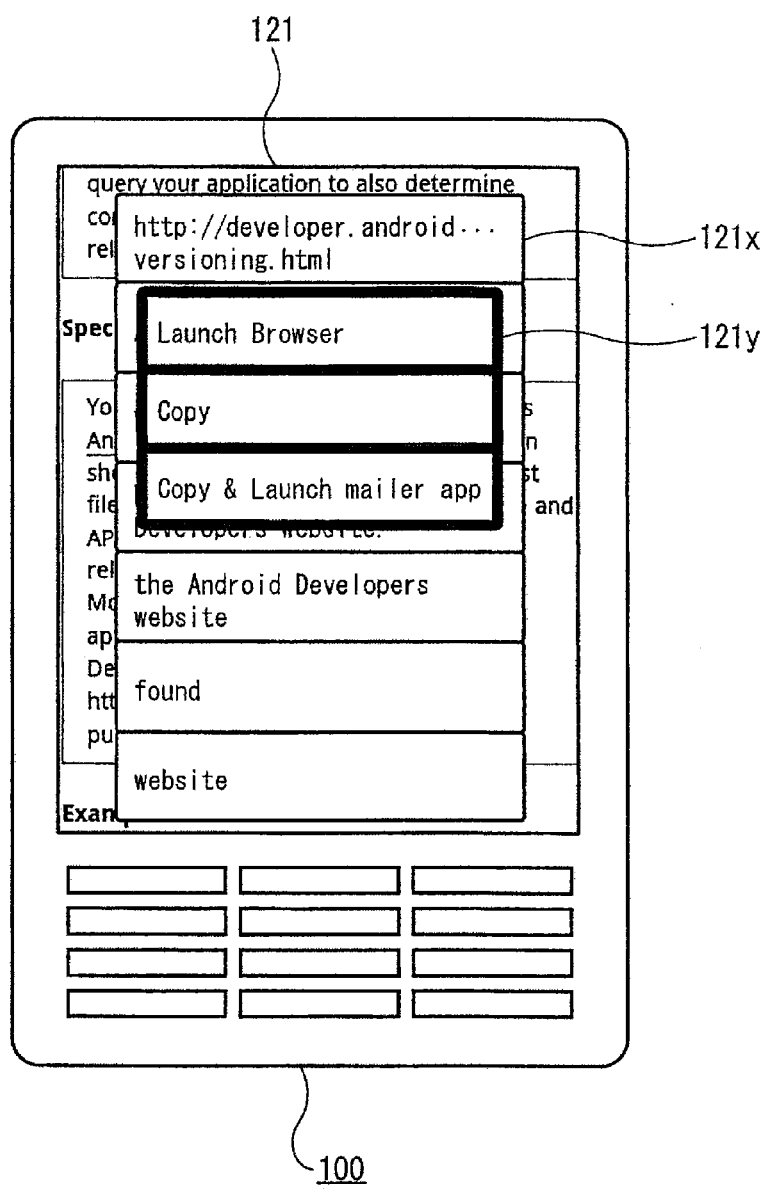
FIG. 7 illustrates further exemplary processing related to the touch operation of FIG. 5.

Following the display of the display area 121x, a user may select one of the displayed candidate character strings using another touch operation (e.g., by tapping one of the character strings listed in the display area 121x). Referring to FIG. 7, the user selects the highest prioritized candidate character string, which in this case corresponds to a web address. Following the selection of the web address from the display area 121x, the controller 110 may output a display area 121y, which includes the functions associated with the selected candidate character string (i.e., the processing methods listed in the classification table 400 of FIG. 4).

Turning to FIG. 7, the candidate character string in this case is classified as ID 1 according to the classification table 400 of FIG. 4. According to the classification table 400, the classification of ID 1 includes three associated processing methods: launching a web browser, copying the web address, and copying the web address and launching an electronic mail application. Therefore, following the selection of the web address character string from the display area 121x, the controller 110 outputs the three associated processing functions as a list in display area 121y. After displaying the display area 121y, the user may perform another touch operation on the display 120 to select one of the three associated processing functions. Following the selection of one of the processing functions, the controller 110 controls the mobile phone terminal device 100 to perform the selected processing function.

In another aspect of the present disclosure, character strings may be extracted using hypertext markup language (HTML). Referring to FIG. 8, a user may perform a touch operation with an instruction object, such as a finger or stylus, on the display 120. Display 120 displays text information to a user. The touch operation may correspond to a circle, such as circle C1, traced by the user on the display 120. Following the touch operation, the controller 110 may extract the HTML source code corresponding to the character strings enclosed within the circle C1. The controller 110 may then analyze the HTML code to determine the selected candidate character strings from within the HTML code. In the syntax of HTML, a paragraph is shown with a <p> tag. That is, the range of text bracketed by two <p> tags comprises one paragraph, as illustrated in FIG. 8. The controller 110 extracts the range of characters bracketed by the <p> tags as a candidate character string of one unit. For example, the controller 110 may determine that a word or portion of a word which is enclosed by the circle C1 shown at the upper right of FIG. 8 was extracted. As shown in the lower right portion of FIG. 8, the controller 110 determines that a paragraph tag is used and the paragraph to which each selected word belongs is evaluated and the character string extracted.

The controller 110 may also extract a candidate character string using tags other than a paragraph tag. Moreover, the controller may extract a candidate character string using languages other than HTML.

Obviously, numerous modifications and variations of the present invention are possible in light of the above teachings. It is therefore to be understood that within the scope of the appended claims, the invention may be practiced otherwise than as specifically described herein. For example, the display 120 shown in FIGS. 5-7 may be configured differently than those illustrated in the figures. Further, the values of the tables shown in FIG. 4 are merely examples and the data contained within these tables may be different than that shown in FIG. 4. Moreover, sorting methods other than those illustrated and discussed with reference to FIG. 4 may be used to sort candidate character strings. Additionally, devices other than the mobile phone terminal device 100 shown in FIG. 1 may also be used to perform the features discussed in present disclosure. For example, aspects of the present disclosure may be executed on a smart phone, a tablet, a general purpose computer, a laptop, an electronic reading device, or other such display terminals.

The above disclosure also encompasses the embodiments noted below.

(1) An information processing apparatus comprising: a display that displays data including a plurality of character strings; a touch panel disposed on or formed integrally with the display that detects a touch input; a processor that receives an output from the touch panel corresponding to a detected touch input; extracts one or more character strings from the plurality of character strings based on the detected touch input; prioritizes the extracted one or more character strings; and controls the display to display the extracted one or more character strings in order based on the prioritizing.

(2) The information processing apparatus of (1), wherein the detected touch input is a continuous touch input that corresponds to an enclosed shape, and the processor extracts the one or more character strings based on the enclosed shape.

(3) The information processing apparatus of (1) or (2), wherein the processor extracts character strings within the enclosed shape as the extracted one or more character strings.

(4) The information processing apparatus of any one of (1) to (3), wherein the processor extracts character strings within the enclosed shape and intersecting a border of the enclosed shape as the extracted one or more character strings.

(5) The information processing apparatus of any one of (1) to (4), wherein the processor assigns one of a plurality of classifications to the extracted one or more character strings.

(6) The information processing apparatus of any one of (1) to (5), wherein the processor prioritizes the extracted one or more character strings on the basis of the classification.

(7) The information processing apparatus of any one of (1) to (6), wherein each of the plurality of classifications are associated with a respective priority weight value.

(8) The information processing apparatus of any one of (1) to (7), wherein the processor prioritizes the extracted one or more character strings on the basis of the priority weight value associated with the classification.

(9) The information processing apparatus of any one of (1) to (8), wherein the classifications include at least a web address classification, an email classification, a sentence classification, a classification indicating that the extracted character string includes two consecutive capitalized words, a classification indicating that the extracted character string begins with a preposition, and a classification indicating that the extracted character string is located close to a center of gravity of the detected touch input.

(10) The information processing apparatus of any one of (1) to (9), wherein the processor assigns a respective priority weight to each of the extracted one or more character strings based on a position of the extracted one or more character strings in relation to the touch input.

(11) The information processing apparatus of any one of (1) to (10), wherein the processor prioritizes the extracted one or more character strings on the basis of the priority weight value associated with the position.

(12) The information processing apparatus of any one of (1) to (11), further comprising: a memory that stores an association between each of the plurality of classifications and one or more processing operations.

(13) The information processing apparatus of any one of (1) to (12), wherein the touch panel receives a second touch input selecting one of the prioritized one or more character strings displayed by the display.

(14) The information processing apparatus of any one of (1) to (13), wherein the processor controls the display to display one or more processing operations available for selection based on the classification of the selected character string.

(15) The information processing apparatus of any one of (1) to (14), wherein the touch input receives a touch input selecting one of the one or more processing operations.

(16) The information processing apparatus of any one of (1) to (15), wherein the processor performs the selected processing operation on the selected character string based on the touch input selecting the one of the one or more processing operations.

(17) The information processing apparatus of any one of (1) to (16), further comprising: a memory that stores an association between each of the plurality of classifications and one or more processing operations.

(18) The information processing apparatus of any one of (1) to (17), wherein the web address classification is associated with a process to activate a browser, a process to copy the extracted character string and a process to activate an electronic messaging application, the email classification is associated with the process to activate the electronic messaging application, the sentence classification is associated with the process to copy the extracted character string and a re-extraction process, the classification indicating that the extracted character string includes two consecutive capitalized words is associated with the process to copy the extracted character string and a process to activate an Internet search using the extracted character string, the classification indicating that the extracted character string begins with a preposition is associated with the process to copy the extracted character string and a process to activate an Internet search using the extracted character string, and the classification indicating that the extracted character string is located close to a center of gravity of the detected touch input is associated with the process to copy the extracted character string.

(19) An information processing method performed by an information processing apparatus, the method comprising: detecting a touch input at a touch panel disposed on or formed integrally with a display; extracting one or more character strings from a plurality of character strings displayed on the display based on the detected touch input; prioritizing the extracted one or more character strings; and controlling the display to display the extracted one or more character strings in order based on the prioritizing.

(20) A non-transitory computer-readable medium including computer program instructions, which when executed by an information processing apparatus, cause the information processing apparatus to perform a process, the process comprising: detecting a touch input at a touch panel disposed on or formed integrally with a display; extracting one or more character strings from a plurality of character strings displayed on the display based on the detected touch input; prioritizing the extracted one or more character strings; and controlling the display to display the extracted one or more character strings in order based on the prioritizing.

The invention claimed is:

1. An information processing apparatus comprising:
a display configured to display data including a plurality of character strings;
a touch panel disposed on or formed integrally with the display configured to detect a touch input; and
circuitry configured to
receive an output from the touch panel corresponding to a detected touch input;
extract one or more character strings from the plurality of character strings based on the detected touch input;
prioritize the extracted one or more character strings; and
control the display to display the extracted one or more character strings in an order based on the prioritizing, wherein
the detected touch input is a continuous touch input that corresponds to an enclosed shape, and
the processor extracts character strings within the enclosed shape as the extracted one or more character strings.

2. The information processing apparatus of claim 1, wherein
the processor extracts character strings within the enclosed shape and intersecting a border of the enclosed shape as the extracted one or more character strings.

3. An information processing apparatus comprising:
a display configured to display data including a plurality of character strings;
a touch panel disposed on or formed integrally with the display configured to detect a touch input; and
circuitry configured to
receive an output from the touch panel corresponding to a detected touch input;
extract one or more character strings from the plurality of character strings based on the detected touch input;
assign one of a plurality of classifications to the extracted one or more character strings;
prioritize the extracted one or more character strings; and
control the display to display the extracted one or more character strings in an order based on the prioritizing.

4. The information processing apparatus of claim 3, wherein
the circuitry is configured to prioritize the extracted one or more character strings on the basis of the classification.

5. The information processing apparatus of claim 3, wherein
each of the plurality of classifications are associated with a respective priority weight value.

6. The information processing apparatus of claim 5, wherein
the processor prioritizes the extracted one or more character strings on the basis of the priority weight value associated with the classification.

7. The information processing apparatus of claim 3, wherein
the classifications include at least a web address classification, an email classification, a sentence classification, a classification indicating that the extracted character string includes two consecutive capitalized words, a classification indicating that the extracted character string begins with a preposition, and a classification indicating that the extracted character string is located close to a center of gravity of the detected touch input.

8. An information processing apparatus comprising:
a display configured to display data including a plurality of character strings;
a touch panel disposed on or formed integrally with the display configured to detect a touch input; and
circuitry configured to
receive an output from the touch panel corresponding to a detected touch input;
extract one or more character strings from the plurality of character strings based on the detected touch input;
assign a respective priority weight to each of the extracted one or more character strings based on a position of the extracted one or more character strings in relation to the touch input;
prioritize the extracted one or more character strings; and
control the display to display the extracted one or more character strings in an order based on the prioritizing.

9. The information processing apparatus of claim 8, wherein
the circuitry is configured to prioritize the extracted one or more character strings on the basis of the priority weight value associated with the position.

10. The information processing apparatus of claim 3, further comprising:
a memory that stores an association between each of the plurality of classifications and one or more processing operations.

11. The information processing apparatus of claim 10, wherein
the touch panel is configured to receive a second touch input selecting one of the prioritized one or more character strings displayed by the display.

12. The information processing apparatus of claim 11, wherein
the circuitry is configured to control the display to display one or more processing operations available for selection based on the classification of the selected character string.

13. The information processing apparatus of claim 12, wherein
the touch panel is configured to receive a touch input selecting one of the one or more processing operations.

14. The information processing apparatus of claim 13, wherein
the circuitry is configured to perform the selected processing operation on the selected character string based on the touch input selecting the one of the one or more processing operations.

15. The information processing apparatus of claim 7, further comprising:
a memory that stores an association between each of the plurality of classifications and one or more processing operations.

16. The information processing apparatus of claim 15, wherein
the web address classification is associated with a process to activate a browser, a process to copy the extracted character string, or a process to activate an electronic messaging application,
the email classification is associated with the process to activate the electronic messaging application,
the sentence classification is associated with the process to copy the extracted character string and a re-extraction process,
the classification indicating that the extracted character string includes two consecutive capitalized words is associated with the process to copy the extracted character string and a process to activate an Internet search using the extracted character string, the classification indicating that the extracted character string begins with a preposition is associated with the process to copy the extracted character string and a process to activate an Internet search using the extracted character string, and the classification indicating that the extracted character string is located close to a center of gravity of the detected touch input is associated with the process to copy the extracted character string.

\* \* \* \* \*